(12) United States Patent
Wichert

(10) Patent No.: US 8,493,011 B2
(45) Date of Patent: Jul. 23, 2013

(54) METHOD FOR OPERATING AN ELECTRONICALLY COMMUTATED ELECTRIC MOTOR AND APPARATUS THEREFOR

(75) Inventor: René Wichert, Durlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 255 days.

(21) Appl. No.: 13/102,865

(22) Filed: May 6, 2011

(65) Prior Publication Data

US 2011/0279073 A1  Nov. 17, 2011

(30) Foreign Application Priority Data

May 12, 2010  (DE) .......................... 10 2010 020 215

(51) Int. Cl.
*H02P 6/18* (2006.01)
*H02P 1/04* (2006.01)

(52) U.S. Cl.
USPC ............ 318/400.33; 318/400.02; 318/400.32; 318/430; 318/254

(58) Field of Classification Search
USPC ................. 318/400.33, 400.02, 400.32, 430, 318/254
See application file for complete search history.

(56) References Cited

U.S. PATENT DOCUMENTS

| | | | |
|---|---|---|---|
| 4,253,053 A * | 2/1981 | Ray et al. ...................... | 318/701 |
| 6,288,514 B1 * | 9/2001 | Direnzo et al. ............... | 318/701 |
| 6,291,949 B1 * | 9/2001 | Green ...................... | 318/400.33 |
| 7,294,988 B2 * | 11/2007 | Ajima et al. .................. | 318/712 |
| 7,298,106 B2 * | 11/2007 | Yamamoto et al. ...... | 318/400.27 |
| 7,334,854 B1 * | 2/2008 | Chang et al. ............. | 318/400.11 |
| 7,450,355 B2 * | 11/2008 | Ochiai ........................... | 361/31 |
| 7,466,094 B2 * | 12/2008 | Kim ........................ | 318/400.32 |
| 7,501,787 B2 * | 3/2009 | Tajima et al. ................. | 318/802 |
| 8,054,030 B2 * | 11/2011 | Son et al. ...................... | 318/778 |
| 8,203,293 B2 * | 6/2012 | Ohgushi ................... | 318/400.02 |
| 8,324,851 B2 * | 12/2012 | Matsuo et al. ........... | 318/400.33 |
| 8,362,738 B2 * | 1/2013 | Kauppinen et al. ........... | 318/800 |
| 2001/0030517 A1 * | 10/2001 | Batzel ........................... | 318/254 |
| 2008/0079378 A1 * | 4/2008 | Nakatsugawa et al. ....... | 318/430 |
| 2009/0184678 A1 * | 7/2009 | Son et al. ...................... | 318/801 |
| 2010/0225262 A1 * | 9/2010 | Matsuo et al. ........... | 318/400.33 |
| 2011/0031909 A1 * | 2/2011 | Ohgushi ................... | 318/400.02 |
| 2011/0254491 A1 * | 10/2011 | Tamai et al. ............. | 318/400.33 |
| 2012/0194113 A1 * | 8/2012 | Lee et al. ................. | 318/400.33 |
| 2012/0223665 A1 * | 9/2012 | Wilharm ................... | 318/400.33 |

* cited by examiner

*Primary Examiner* — Paul Ip
(74) *Attorney, Agent, or Firm* — Walter Ottesen, P.A.

(57) ABSTRACT

The invention relates to a method of controlling the run-up of an electronically commutated electric motor (1) to drive a tool. A rotor (7) rotates in the rotating field (21) of the stator (2). The field windings (3, 4, 5) alternately have a supply voltage applied thereto via an actuation unit (10) in order to obtain an advancing motor rotating field. For advancing the rotating field in the rotational direction (29) of the rotor (7), the inductance of the arrangement of the field coils (3, 4, 5), which is ascertained via a changing measuring current ($I_M$), is evaluated and the advancement is carried out upon reaching a maximum.

17 Claims, 3 Drawing Sheets

| Position Rotor | Current Flow Rotation Commutation | | Current Flow Measurement Commutation | |
|---|---|---|---|---|
| 1 | U=U+ | W=U- | U=U+ | V=U- |
| 2 | V=U+ | W=U- | U=U+ | W=U- |
| 3 | V=U+ | U=U- | V=U+ | W=U- |
| 4 | W=U+ | U=U- | V=U+ | U=U- |
| 5 | W=U+ | V=U- | W=U+ | U=U- |
| 6 | U=U+ | V=U- | W=U+ | V=U- |

FIG. 7

METHOD FOR OPERATING AN ELECTRONICALLY COMMUTATED ELECTRIC MOTOR AND APPARATUS THEREFOR

CROSS REFERENCE TO RELATED APPLICATION

This application claims priority of German patent application no. 10 2010 020 215.0, filed May 12, 2010, the entire content of which is incorporated herein by reference.

FIELD OF THE INVENTION

The invention relates to a method of controlling the run-up of an electronically commutated electric motor from standstill, in particular an electric motor to drive a tool in a handheld work apparatus.

BACKGROUND OF THE INVENTION

Brushless DC motors are often used to drive handheld work apparatus such as chain saws, cut-off machines, blowers, brushcutters, hedge trimmers, or the like.

Electronically commutated electric motors require defined starting conditions for starting the run-up so that the electronically commutated rotating field drives the rotor in the intended direction. Defined operating conditions are also required during the run-up of the motor to the operating speed. It must be ensured that the rotor can reliably follow the rotating field whose speed increases. It is known to operate the motor by means of running up according to predefined switching patterns during the run-up. If the rotor is slowed down unexpectedly during the run-up, this may cause the rotor to no longer be able to follow the rotating field of the stator and the motor fails to start. The starting of the brushless DC motor has failed.

To ensure a reliable run-up of an electronically commutated electric motor, it is known to provide positional sensors which detect the position of the rotor and pass the information on to the electronic control unit of the motor. For example, hall sensors are used which ensure that the rotating field is always switched to be adapted to the position of the rotor. Even when load suddenly occurs on the rotor, a run-up of the motor is ensured, since the rotating field is always adapted to the current position of the rotor.

When the operating speed is reached, the rotating field is controlled by the voltages induced in the field windings of the stator, whose magnitude and direction ensure a reliable control of the electronically commutated electric motor in the range of the operating speed.

SUMMARY OF THE INVENTION

It is an object of the invention to provide a method for the run-up of an electronically commutated electric motor which ensures a reliable run-up of the electric motor to an operating speed without cost-intensive sensors.

The method of the invention is for controlling the run-up of an electronically commutated electric motor from standstill. The electric motor includes: a rotationally fixed standing stator defining a rotating field; a rotor configured to rotate about an axis in the rotating field of the stator; at least three field windings arranged offset one from the other by an angle of rotation; the field windings having coil terminals (U, V, W) electrically connected to each other; a voltage source configured to supply a voltage; an actuating unit for alternately applying the voltage to the coil terminals (U, V, W); and, a control unit configured to control the actuation unit for generating the rotating field in such a manner that the rotating field is advanced by a rotational angle in dependence upon the position of the rotor relative to the field windings. The method of the invention includes the steps of: providing a changing measurement current ($I_M$); determining the inductance of the arrangement of the field windings from the measurement current; and, initiating the advance of the rotating field in the rotational direction of the rotor when the inductance reaches a maximum.

The central idea of the invention is to provide a voltage signal on the free coil terminal of the field windings of the stator and to pick up and evaluate the generated measuring current. Thereby, the inductance of the field coil arrangement is determined by the differential measurement of the measuring current within a given period of time. The advancement of the rotating field to a field coil following in the direction of rotation for the purpose of further commutation is carried out when the inductance of the coil arrangement determined via the measuring current has reached a maximum. The maximum of the inductance indicates that the rotor has moved on by such an angle of rotation that the switchover of the commutation is necessary.

During a rotational phase of the rotor lying between two successive commutations, a measuring voltage is applied several times so that an extremism (for example, a maximum) of the inductance can be determined from the measured current and the inductance ascertained therefrom in order to initiate or switchover the commutation to a next rotor position in a precisely timed manner.

The measuring current is expediently applied after the decay of a torque-generating commutation current so that the measuring current itself is minimally influenced by the commutation current. Thereby, the time duration of the measuring current is shorter, in particular, multiple times shorter than the time period of the torque-generating commutation current so that any effects on the electromotive commutation are negligible.

In principle, the measuring current is applied via a coil terminal of the switched commutation current and the free coil terminal of the field windings so that the flow direction of the current in a field winding of the field arrangement is reversed. Thus, a quick decay of the commutation current is forced, and the forming measurement current is largely free from disturbances.

A series of voltage pulses having changeable pulsewidths is preferred as the supply voltage which generates the commutative current which, in turn, develops the torque. The voltage signal applied to generate the measuring current is in an interval between two voltage pulses of the supply voltage. In order to achieve an effective commutation, it is provided to apply a voltage signal in each interval between voltage pulses and to evaluate the measurement current resulting therefrom, so that a high concentration of measurements is available.

An electronically commutated electric motor for carrying out the method of the invention is disclosed. The electric motor includes a stator to which a rotor is assigned and this rotor is equipped with at least one permanent magnet. The stator has at least three field windings offset one from the other at an angle of rotation and whose coil terminals are connected to each other. The voltage of a voltage source is alternately applied to the terminals of the field coils via an actuating unit. The actuation unit for generating a motor rotating field is controlled by a control unit in such a manner that, in dependence on the position of the rotor relative to the field windings of the stator, the rotating field is successively advanced further by a field winding following in the angle of rotation. The control unit is configured so as to apply a measuring current to the field winding arrangement. A current measurement device is provided to detect current change in the measuring current. The output signal of the current measurement device is conveyed to the control unit. The control unit controls the advancement of the rotating field in dependence upon the values of the successive measurements of the measuring current.

BRIEF DESCRIPTION OF THE DRAWINGS

The invention will now be described with reference to the drawings wherein:

FIG. 7 is a table of the rotation commutation and measurement commutation to be switched.

DESCRIPTION OF THE PREFERRED EMBODIMENTS OF THE INVENTION

Figure 1:
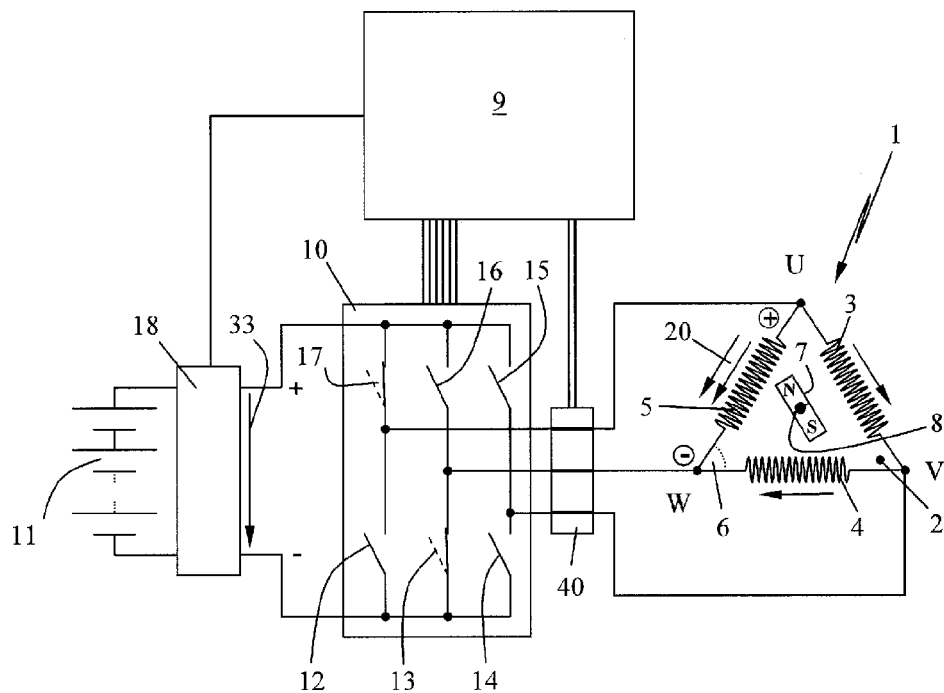
FIG. 1 is a schematic of a brushless DC motor with an electronic control unit for commutation.

In FIG. 1, an electronically commutated electric motor 1, which forms a so-called brushless motor, is schematically shown. Such an electronically commutated electric motor includes a stator 2 having field windings (3, 4, 5) which, in the embodiment shown, are arranged offset from each other at an angle δ of 60°. The coil ends of the mutually adjacent coils are connected to each other, whereby the coil arrangement 3 has electrical connecting points U, V and W. The connection formed thereby is referred to as a delta connection; alternatively, the coils can also be connected to each other in a wye connection.

A rotor 7, which rotates about an axis 8 is assigned to the stator 2. In the shown embodiment, the rotor 7 is shown in the simplest configuration in the form of a permanent magnet having a north pole N and a south pole S.

The rotor 7 can be configured as a rotor running in the stator; the rotor 7 can also be configured pot-shaped and overlap the arrangement of the field windings (3, 4, 5). Such a rotor is a so-called external rotor.

For the rotor 7 to be rotatably driven in the rotating field generated by the field windings (3, 4, 5), it is necessary to progressively advance the rotating field generated by the arrangement of the field windings in the direction of rotation. In the brushless DC motor shown, this is achieved via electronic commutation, for which purpose a supply voltage 33, provided by a voltage source 11 having DC voltage, is alternately applied to the connections U, V and W of the arrangement of the field windings (3, 4, 5) via an actuating unit. The voltage source 11 is preferably a battery, for example, a lithium-based battery which provides a DC-voltage for the operation of the motor 1.

The control unit 10 includes a plurality of power switches 12 to 17 via which each connection U, V and W of the arrangement of the field windings (3, 4, 5) can be alternately connected to the plus pole of the supply voltage 33 or the minus pole of the supply voltage 33. The switches 12 to 17 are preferably electronic switches such as MOSFETs, thyristors, or similar electronic switches. The switches 12 to 17 are triggered via a control unit 9 which preferably includes a microprocessor. In order to, for example, apply a torque-generating commutation voltage to the terminals U and W, the switches 13 and 17 are closed (FIG. 1). A torque-generating commutation current is generated via the winding 5, which is indicated by the double arrow 20. A current half as large flows via the two field windings 3 and 4 which are parallel to the field winding 5.

In the embodiment according to FIG. 1, a voltage divider 18 controlled by the control unit 9 is arranged between the voltage source 11 and the supply voltage 33.

Figure 2:
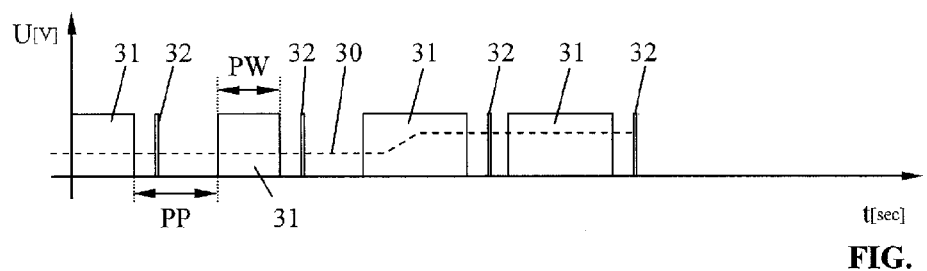
FIG. 2 is a schematic of a supply voltage as a series of voltage pulses with measurement pulses applied during the pulse intervals.

In FIG. 2, the operation of the voltage divider 18 is schematically shown. A sequence of voltage pulses 31 are emitted at the voltage divider 18, depending on the desired mean voltage 30, shown by a broken line in FIG. 2. The voltage pulses 31 are separated from each other by pulse intervals PP of no voltage. The mean voltage 30 adjusts itself in accordance with the voltage pulses 31 whose pulsewidth PW can be variably adjusted.

Figure 3:
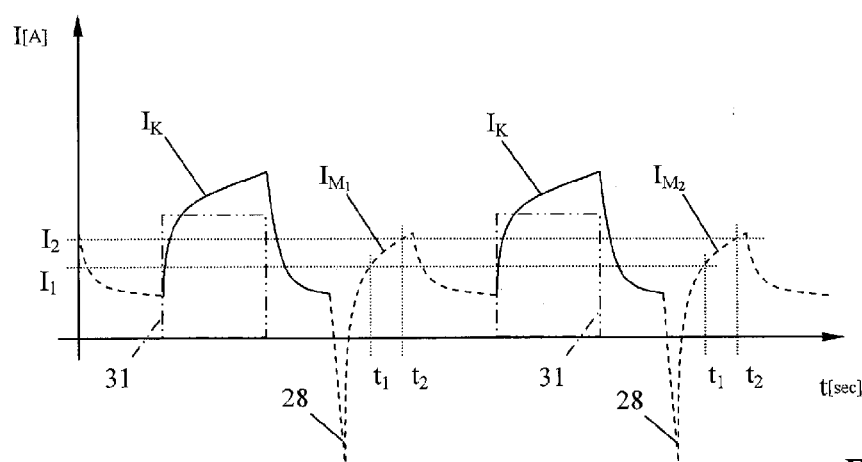
FIG. 3 is a schematic of the generated commutation currents and measuring currents.

Each voltage pulse 31 corresponds to a commutation current $I_K$ forming in the coil supplied with current, as is shown in FIG. 3. The current $I_K$ increases during the duration of the voltage pulse 31 until the voltage pulse ends. Then, the commutation current $I_K$ decreases until the next voltage pulse 31 leads to another increase in the torque-generating commutation current $I_K$.

Figure 4:
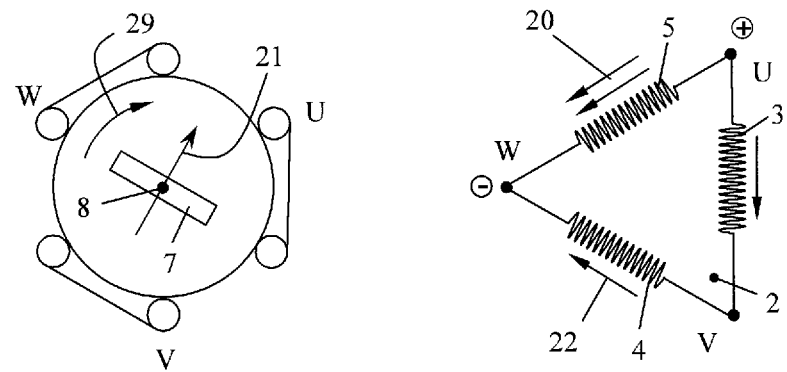
FIG. 4 is a schematic of the brushless DC-motor with commutation in a position 1.

The run-up of a brushless motor to an operating speed must take place in such a manner that the magnetic rotating field of the stator current effects an acceleration of the rotor. This implies that the position of the rotor 7 in the stator is known at the time of starting the electric motor. For this purpose, the inductances of the individual field coils with the rotor at standstill are measured and compared with each other. The rotational position of the rotor 7 can be determined on the basis of these results. If the rotational position is known, the first field winding corresponding to the determined rotational position of the rotor 7 is supplied with current via the actuation unit 10 by the closing of the corresponding switches 12 to 17, so that the rotor 7 rotates in the rotational direction 29 as shown in FIG. 4. Corresponding to position 1 of the table in FIG. 7, in relation to the first rotor position, voltage is applied across the terminals U and W of the field winding 5, whereby a rotating field illustrated by arrow 21 is generated. The rotor 7 is driven and follows the rotating field in the rotational direction 29.

Figure 5:
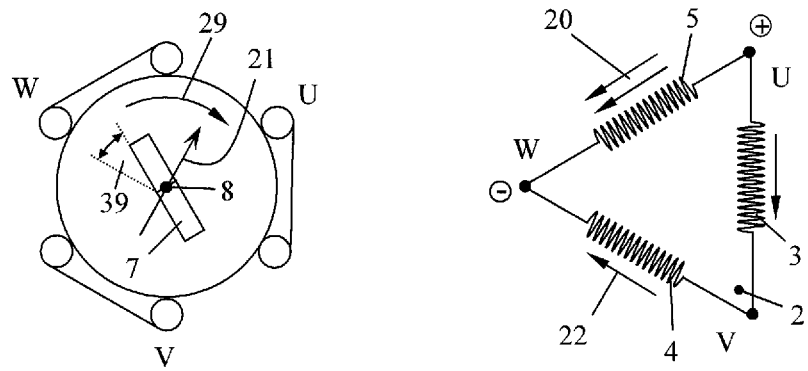
FIG. 5 is a view according to FIG. 4 wherein the rotor is rotated approximately 30° in the direction of rotation.

In FIG. 5, the rotor has moved by an angle 39 of approximately 30° in the rotational direction 29; the rotating field shown by the arrow 21 remains unchanged, since the field winding 5 of the stator 2 continues to be directly supplied with current. The further the rotor 7 rotates, the lower the driving torque of the field 21. To ensure a permanent driving force, the switchover of the field windings to position 2 (table in FIG. 7) must occur at the correct time corresponding to the actual position of the rotor 7.

To determine the position of the rotor 7 relative to the stator 2 and thus relative to the arrangement of the field windings 3, 4 and 5, a voltage signal 32 is briefly applied to the coil terminal U of the commutation current and the free coil terminal V of the field windings (3, 4, 5) during a rotation commutation (e.g. in position 1). A measuring current deviating from the commutation current $I_K$ is generated thereby, which, for example, reverses the flow direction of the current 22 in the field winding 4. Switching over to the measurement commutation according to FIG. 6 expediently always occurs whenever there is an interval PP between the voltage pulses 31, that is, in the intervals between the commutation currents $I_K$, as shown in FIG. 3.

Advantageously, a voltage signal 32 is provided in each interval PP between two voltage pulses 31, which signal causes the generation of a measuring current $I_M$. The duration of the voltage signal 32 is shorter, in particular, several times shorter than the duration of the torque-generating voltage pulse 31. The voltage signal 32, which leads to a measuring current $I_M$ (FIG. 3), is in position 1 always applied across the terminals U and W when the commutation current $I_K$ has largely decayed. Because of the reversal of the flow direction in the field coil 4—in the delta connection shown in the embodiment—upon switching on the voltage pulse, a negative peak occurs and the measuring current $I_M$ builds up. This measuring current is measured in a measurement unit 40. To determine the inductance of the arrangement of the field coils (3, 4, 5), a current measurement $I_1$ is taken at time $t_1$ and a current measurement $I_2$ is taken at a time $t_2$. According to the formula $$L = u_L \frac{dt}{di}$$

the inductance of the entire arrangement of the field windings (3, 4, 5) can be approximately determined, wherein: $u_L$ is the measuring current, dt is the time period after the application of the measuring current, and di is the changing current. Because the measuring voltage is the same and the time of the measurement is always chosen to be the same, there results a direct proportionality between the inductance L and the measured current di. The following applies: L~di.

After each voltage pulse 31 effecting a commutation current $I_K$ (when the commutation current has largely decayed), a voltage pulse 32 for the generation of a measuring current $I_M$ is applied in order to draw conclusions about the inductance of the entire arrangement with the help of the current difference measurement. Because this inductance is also dependent on the magnetic flow permeating the surface of a coil and because the surface penetrated by the magnetic flow changes geometrically with the rotation of the rotor 7, a direct conclusion about the position of the rotor 7 can be drawn from the inductance. According to the invention, the commutation is advanced to position 2 (table in FIG. 7) when the determined inductance reaches a maximum value. The value is determined in that the inductances derived via the measuring current $I_M$ between sequential commutation currents $I_K$ are compared to each other until a maximum is detected. If this maximum is detected, the control unit 9 switches the actuation unit 10 to the next commutation, for example, position 2 of the commutation table of FIG. 7. In this manner, there is a switchover to the next commutation position according to the table in FIG. 7 whenever a maximum value of the inductance is ascertained.

Figure 6:
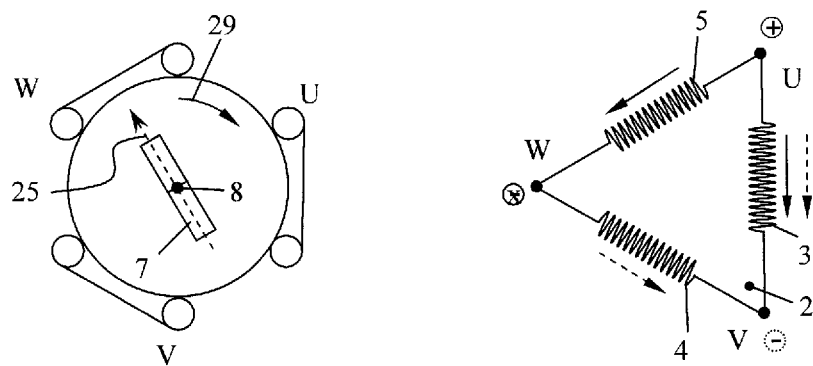
FIG. 6 is a view according to FIG. 5 with applied measurement commutation.

In FIG. 6, the arrangement is shown at the time of a measuring process of the measuring current $I_{M1}$ or $I_{M2}$. The commutating current $I_K$ is turned off (pulsewidth of the voltage pulse 31), the switch 13 is opened and the switch 14 is closed. Then, the voltage signal 32 is applied across the field winding 3. A field 25 is formed which is aligned in the same direction as the magnetic field of the rotor 7. When the measurement is concluded, there is switching back to the commutating field winding 5, i.e. the switch 14 is opened and the switch 13 is closed again.

Advantageously, the measurement of the magnitude of the measuring current always takes place at the same time intervals on the time axis, so that the inductances determined by calculating the difference in the sequential measurement cycles are approximately exactly the same. An accurate, precisely timed commutation of the rotating field to a subsequent position is thus ensured.

A corresponding measurement commutation is assigned to each commutation of a position (positions 1 to 6, FIG. 7). A terminal of the rotation commutation and the free terminal of the field windings are always used for the measurement commutation. In position 1, these are terminals U and V; in position 2, these are terminals W and U, and so on.

When the rotor 7 has reached a speed at which voltages induced in the field coils by the rotating motor can be measured, which, for example, can be done via the measurement unit 40, the run-up of the electronically commutated electric motor is completed. The control unit now controls the commutation of the brushless DC motor via the induced voltages.

In the embodiment, the determination of the current resulting from the applied measuring voltage is shown as a phase current measurement on the example of a delta connection (FIG. 1). A corresponding current measuring can also be provided in a wye connection. Because MOSFETs or similar electronic switches are advantageously used as the power switches 12 to 17 the current measuring can also be effected via the voltage drop at the corresponding power switches 12 to 17 of the three-phase bridge 10. Alternatively, it can also be practical to carry out a current measurement via a shunt resistor which can be arranged in the supply line of the three-phase bridge 10. The shunt resistor can be arranged in the negative line or the positive line.

In the embodiment according to FIG. 1, a voltage divider 18 is provided, which regulates the DC voltage of the battery 11 to a desired value, for example, by a pulsewidth modulated output signal according to FIG. 2. In lieu of the voltage divider 18, the regulation of the pulsewidth of a supplied voltage signal 32 corresponding to the signal sequence in FIG. 2 can also be achieved via the actuation unit 10 configured as a three-phase bridge.

It is understood that the foregoing description is that of the preferred embodiments of the invention and that various changes and modifications may be made thereto without departing from the spirit and scope of the invention as defined in the appended claims.

What is claimed is:

1. A method of controlling the run-up of an electronically commutated electric motor from standstill, said electric motor including:
   a rotationally fixed standing stator defining a rotating field;
   a rotor configured to rotate about an axis in said rotating field of said stator;
   at least three field windings arranged offset one from the other by an angle of rotation;
   said field windings having coil terminals (U, V, W) electrically connected to each other;
   a voltage source configured to supply a voltage;
   an actuating unit for alternately applying said voltage to said coil terminals (U, V, W); and,
   a control unit configured to control said actuation unit for generating said rotating field in such a manner that said rotating field is advanced by a rotational angle in dependence upon the position of said rotor relative to said field windings; said method comprising the steps of:
   providing a changing measurement current ($I_M$);
   determining the inductance of the arrangement of said field windings from said measurement current; and, initiating the advance of said rotating field in the rotational direction of the rotor when said inductance reaches a maximum.

2. The method of claim 1, wherein the advancement of said rotating field is executed when the determined inductance of said field windings reaches a maximum.

3. The method of claim 1, comprising the further step of:
interposing a sequence of intervals with the measurement current ($I_M$) during a rotating phase of the rotor between two sequential commutations.

4. The method of claim 3, comprising the further step of comparing inductances determined sequentially during a commutation until a maximum is detected.

5. The method of claim 1, wherein the measurement current ($I_M$) is applied after a commutation current ($I_K$) which generates torque has decayed.

6. The method of claim 1, wherein the time duration of the measurement current ($I_M$) is shorter than the time duration of a torque generating commutation current ($I_K$).

7. The method of claim 6, wherein said time duration of the measurement current ($I_M$) is many times shorter than the time duration of the torque generating commutation current ($I_K$).

8. The method of claim 1, wherein the measurement current ($I_M$) is applied via one of said coil terminals (U, V, W) of a commutation current and the free coil terminal (U, V, W) of said field windings.

9. The method of claim 8, wherein the measurement current ($I_M$) is applied to the field windings in such a manner that the flow direction of the current in the field windings reverses.

10. The method of claim 1, wherein the supply voltage applied to generate a torque generating commutation current ($I_K$) is a series of voltage pulses having an adjustable pulsewidth.

11. The method of claim 10, wherein the voltage signal applied to generate the measurement current ($I_M$) lies in an interval between two voltage pulses of the supply voltage.

12. The method of claim 10, wherein a measurement current ($I_M$) generating voltage signal is provided in every interval between two voltage pulses.

13. The method of claim 1, wherein said electric motor is a drive for a tool in a handheld work apparatus such as a motor-driven chain saw, a brushcutter, a hedge trimmer or the like.

14. An electronically commutated electric motor as a drive for a tool, comprising:
a stator having at least three field windings;
a rotor associated with said stator and having a rotation direction;
said field windings having coil terminals (U, V, W) electrically connected to each other;
a voltage source for supplying a voltage;
an actuating unit configured to apply said voltage to said field windings for generating a motor rotating field;
a control unit configured to control said actuating unit for applying said voltage to said field windings so as to cause said rotating field to successively advance in said rotation direction in dependence upon the position of said rotor to said field windings;
said control unit being configured to apply a measurement current ($I_M$) to the arrangement of said field windings;
a current measuring device configured to detect said measurement current ($I_M$) and to output a signal to said control unit; and,
said control unit being configured to determine an inductance maximum in dependence upon the values of sequential measurement currents ($I_M$) and to then initiate an advance of said rotating field.

15. The electric motor of claim 14, wherein said measurement current ($I_M$) is applied via said actuation unit.

16. The electric motor of claim 14, wherein said measurement current ($I_M$) is applied via the coil terminal which is free during the applied commutation.

17. The electric motor of claim 14, wherein said electric motor is a drive for a tool in a handheld work apparatus such as a motor-driven chain saw, a brushcutter, a hedge trimmer or the like.

* * * * *

UNITED STATES PATENT AND TRADEMARK OFFICE
CERTIFICATE OF CORRECTION

PATENT NO. : 8,493,011 B2  Page 1 of 1
APPLICATION NO. : 13/102865
DATED : July 23, 2013
INVENTOR(S) : Rene Wichert It is certified that error appears in the above-identified patent and that said Letters Patent is hereby corrected as shown below:

In the Specification

In Column 2:
Line 27: delete "extremism" and insert -- extremum -- therefor.

In Column 3:
Line 39: delete "δ" and insert -- 6 -- therefor.

In Column 4:
Line 64: insert -- $I_M$, -- after "current".

Signed and Sealed this
Seventeenth Day of September, 2013

Teresa Stanek Rea
*Deputy Director of the United States Patent and Trademark Office*